(12) United States Patent
Choi et al.

(10) Patent No.: US 11,354,882 B2
(45) Date of Patent: Jun. 7, 2022

(54) IMAGE ALIGNMENT METHOD AND DEVICE THEREFOR

(71) Applicant: KITTEN PLANET CO., LTD., Seongnam-si (KR)

(72) Inventors: Jong Ho Choi, Suwon-si (KR); Sung Jin Park, Suwon-si (KR); Dong Jun Lee, Suwon-si (KR); Jee Yun Lee, Seoul (KR)

(73) Assignee: KITTEN PLANET CO., LTD., Seongnam-si (KR)

( * ) Notice: Subject to any disclaimer, the term of this patent is extended or adjusted under 35 U.S.C. 154(b) by 33 days.

(21) Appl. No.: 16/728,675

(22) Filed: Dec. 27, 2019

(65) Prior Publication Data
US 2020/0134352 A1  Apr. 30, 2020

Related U.S. Application Data

(63) Continuation of application No. PCT/KR2018/009857, filed on Aug. 27, 2018.

(30) Foreign Application Priority Data

Aug. 29, 2017 (KR) .................. 10-2017-0109287

(51) Int. Cl.
*G06K 9/00* (2022.01)
*G06V 10/25* (2022.01)
(Continued)

(52) U.S. Cl.
CPC .............. *G06V 10/25* (2022.01); *G06V 20/52* (2022.01); *G06V 40/10* (2022.01); *G06V 40/161* (2022.01); *G06V 40/172* (2022.01); *G10L 17/00* (2013.01)

(58) Field of Classification Search
None
See application file for complete search history.

(56) References Cited

U.S. PATENT DOCUMENTS 7,987,111 B1 * 7/2011 Sharma .................. G06Q 30/02
                                                        705/7.29
9,710,708 B1 * 7/2017 Checka .............. G06K 9/00771
(Continued)

FOREIGN PATENT DOCUMENTS

KR  10-2007-0087085 A    8/2007
KR  10-2008-0024541 A    3/2008
(Continued)

OTHER PUBLICATIONS

International Search Report issued in PCT/KR2018/009857; dated Dec. 3, 2018.
(Continued)

*Primary Examiner* — Delomia L Gilliard
(74) *Attorney, Agent, or Firm* — Studebaker & Brackett PC

(57) ABSTRACT

Provided is a method for automatically performing image alignment without a user input. An image alignment method performed by an image alignment device, according to one embodiment of the present invention, can comprise the steps of: recognizing at least one person in an inputted image; determining a person-of-interest among the recognized persons; and performing image alignment, on the basis of the person-of-interest, on the inputted image, wherein the image alignment is performed without an input of a user of the image alignment device for the image alignment.

19 Claims, 16 Drawing Sheets

(51) Int. Cl.
*G10L 17/00* (2013.01)
*G06V 20/52* (2022.01)
*G06V 40/10* (2022.01)
*G06V 40/16* (2022.01)

(56) References Cited

U.S. PATENT DOCUMENTS

| | | | | |
|---|---|---|---|---|
| 2007/0104362 A1* | 5/2007 | Hwang | ............... | G06K 9/00275 382/159 |
| 2011/0280439 A1* | 11/2011 | Harrison | ............ | G06K 9/00221 382/103 |
| 2011/0298912 A1* | 12/2011 | Jelinek | ................. | A61B 5/1171 348/78 |
| 2012/0271121 A1* | 10/2012 | Della Torre | ............ | A61B 5/681 600/301 |
| 2014/0025624 A1* | 1/2014 | Sinha | ..................... | G06N 5/048 706/52 |
| 2014/0037135 A1* | 2/2014 | Kutliroff | ............ | H04N 5/23218 382/103 |
| 2015/0332087 A1* | 11/2015 | Joshi | ........................ | G06K 9/00 382/203 |
| 2016/0004913 A1 | 1/2016 | Park | | |
| 2016/0070954 A1* | 3/2016 | Barak | ................. | G06F 3/04842 382/118 |

FOREIGN PATENT DOCUMENTS

| | | |
|---|---|---|
| KR | 10-2015-0027137 A | 3/2015 |
| KR | 10-2016-0004405 A | 1/2016 |
| KR | 101691782 B1 * | 1/2017 |
| KR | 10-2017-0030421 A | 3/2017 |
| KR | 10-1716365 B1 | 3/2017 |
| KR | 20170030421 A * | 3/2017 |

OTHER PUBLICATIONS

An Office Action mailed by the Korean Intellectual Property Office dated Sep. 16, 2020, which corresponds to Korean Patent Application No. 10-2019-0045839 and is related to U.S. Appl. No. 16/728,675 with English language translation.

* cited by examiner

IMAGE ALIGNMENT METHOD AND DEVICE THEREFOR

CROSS-REFERENCE TO RELATED APPLICATIONS

This application is a Continuation of International Application No. PCT/KR2018/009857 filed on Aug. 27, 2018, which claims benefit of priority to Korean Patent Application No. 10-2017-0109287 filed on Aug. 29, 2017, the entire content of which is incorporated herein by reference.

TECHNICAL FIELD

The present disclosure relates to an image alignment method and device, and more particularly, to a method of determining a person of interest among one or more persons recognized in an input image and performing automatic image alignment on the input image based on the person of interest, and a device performing the method.

BACKGROUND ART

As image processing technology becomes advanced, smart devices or intelligent systems based on the image processing technology are being built and utilized in various fields. For example, an intelligent video surveillance system that detects an object of interest in a surveillance image and detects various events using image processing technology is being built and utilized in the field of surveillance of various environments. For another example, a smart mirror that captures an image of a surrounding area using a camera attached to the front of the smart mirror and provides various content based on the result of analyzing the captured image is being installed and used in various places.

A problem that the smart device and the intelligent system described above have in common is that an automatic alignment function based on an object of interest is not provided. For example, in an intelligent image analysis system, in order to view a surveillance image focused based on an object of interest, an administrator has to go through a series of processes of designating the object of interest in an original image captured by a closed circuit television (CCTV) and, for example, zooming in the image containing the designated object of interest. Since the series of processes must be performed manually by the administrator, user convenience is reduced, and the system cannot be effectively utilized. For another example, when a plurality of persons are located in front of a smart mirror, the smart mirror has to determine any one of the persons as a person of interest and provide relevant content. In this case, when providing the content for the person of interest taken together with a plurality of people, the satisfaction of the user provided with the service is inevitably reduced.

Therefore, to solve the above problem, it is required to come up with a method of determining an object of interest in an input image in consideration of various criteria determined according to the purpose of a device and system and performing automatic image alignment based on the object of interest.

DISCLOSURE

Technical Problem

Aspects of the present disclosure provide a method of performing automatic image alignment on an input image based on an object of interest and a device performing the method.

Aspects of the present disclosure also provide a method of determining an object of interest among one or more objects included in an input image and a device performing the method.

Aspects of the present disclosure also provide a method of determining a person of interest among one or more persons included in an input image and configuring a service provision screen customized for the person of interest, and a device performing the method.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

Technical Solution

According to an aspect of the present disclosure, there is provided an image alignment method including: recognizing one or more persons in an input image by using an image alignment device; determining a person of interest among the recognized persons by using the image alignment device; and performing image alignment on the input image based on the person of interest by using the image alignment device, wherein the image alignment is performed without input from a user of the image alignment device for the image alignment.

In an embodiment, the determining of the person of interest may include: analyzing demographic characteristics of each of the recognized persons; and determining a person of interest who has characteristics matching pre-specified demographic information among the recognized persons by using the analyzed demographic characteristics.

In an embodiment, the determining of the person of interest may include: extracting a face area from each of the recognized persons; and determining a person having a largest extracted face area among the recognized persons as the person of interest.

In an embodiment, the determining of the person of interest may include: detecting an object having a specified shape at a specified position on each of the recognized persons; and determining a first person as the person of interest when the object having the specified shape is detected at the specified position on the first person.

In an embodiment, the determining of the person of interest may include: detecting an object having the shape of a toothbrush at a position around the mouth of each of the recognized persons; and determining a first person as the person of interest when the object having the shape of the toothbrush is detected at the position around the mouth of the first person.

In an embodiment, the determining of the person of interest may include: recognizing a voice; and determining a first person as the person of interest when text corresponding to the recognized voice is detected in an area inside an outline of the first person.

In an embodiment, the determining of the person of interest may include: determining a person of interest who corresponds to a current context through context-based person of interest determination logic performed on each of the recognized persons.

According to another aspect of the present disclosure, there is provided an image alignment device including: one or more processors; a network interface; a memory which loads a computer program to be executed by the processors; and a storage which stores the computer program, wherein the computer program includes an operation of recognizing one or more persons in an input image, an operation of determining a person of interest among the recognized persons, and an operation of performing image alignment on the input image based on the person of interest, wherein the image alignment is performed without input from a user of the image alignment device for the image alignment.

According to another aspect of the present disclosure, there is provided a computer program coupled to a computing device and stored in a recording medium to: recognize one or more persons in an input image; determine a person of interest among the recognized persons; and perform image alignment on the input image based on the person of interest, wherein the image alignment is performed without user input for the image alignment.

According to another aspect of the present disclosure, there is provided a smart mirror including: a front camera sensor which generates an input image; an image alignment processor which recognizes one or more persons in the input image, determines a person of interest among the recognized persons, and performs image alignment on the input image based on the person of interest; and a display which displays a result image obtained by performing the image alignment, wherein the image alignment is performed without user input for the image alignment.

According to another aspect of the present disclosure, there is provided a method of configuring a user-targeted service provision screen. The method includes: recognizing one or more persons in an input image by using a service provision device; determining a person of interest among the recognized persons by using the service provision device; and configuring and displaying a service provision screen for the person of interest based on the input image by using the service provision device, wherein the service provision screen is configured and displayed without user input for the configuration of the service provision screen.

According to another aspect of the present disclosure, there is provided a method of configuring a user-targeted service provision screen. The method includes: recognizing one or more persons in an input image by using a service provision device; receiving biometric data from a biosignal sensor of each of the recognized persons by using the service provision device; determining a person of interest among the recognized persons using the received biometric information by using the service provision device; and configuring and displaying a service provision screen for the person of interest based on the input image by using the service provision device, wherein the service provision screen is configured and displayed without user input for the configuration of the service provision screen.

Advantageous Effects

According to the present disclosure described above, it is possible to determine a person of interest according to a predetermined criterion among one or more persons recognized in an input image and automatically perform image alignment based on the person of interest. The automatic image alignment can be utilized in various fields to improve a sense of immersion and convenience of a user.

For example, automatic image alignment performed in a smart mirror can improve a sense of immersion of a person provided with a service. For another example, automatic image alignment performed in an intelligent video surveillance system can improve the convenience of an administrator who checks a surveillance image through an integrated control device.

In addition, according to the present disclosure described above, a person of interest may be determined among persons recognized in an input image in consideration of demographic characteristic information, information about objects carried by the persons, context information, etc. Therefore, the person of interest can be determined with high accuracy.

According to the present disclosure described above, a customized service screen configured for a person of interest can be provided. Accordingly, the satisfaction of a user provided with a service can be improved.

However, the effects of the present disclosure are not restricted to the one set forth herein. The above and other effects of the present disclosure will become more apparent to one of daily skill in the art to which the present disclosure pertains by referencing the claims.

MODE FOR INVENTION

Figure 1:
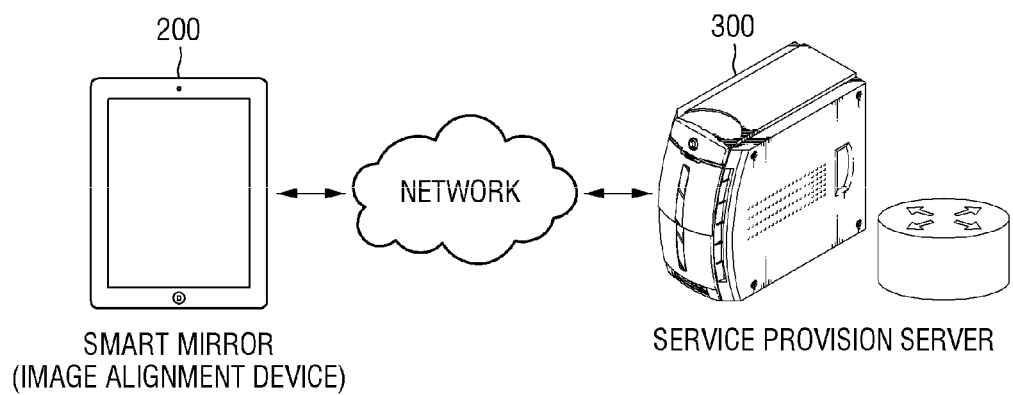
FIG. 1 illustrates the configuration of an image alignment system according to a first embodiment of the present disclosure.

Hereinafter, the present disclosure will be described more fully with reference to the accompanying drawings, in which exemplary embodiments of the present disclosure are shown. Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the invention to those skilled in the art, and the present disclosure will only be defined by the appended claims. Like reference numerals refer to like components throughout the specification.

Unless otherwise defined, all terms (including technical and scientific terms) used herein have the same meaning as commonly understood by one of ordinary skill in the art to which this disclosure belongs. Further, it will be further understood that terms, such as those defined in commonly used dictionaries, should be interpreted as having a meaning that is consistent with their meaning in the context of the relevant art and will not be interpreted in an idealized or overly formal sense unless expressly so defined herein. The terms used herein are for the purpose of describing particular embodiments only and is not intended to be limiting. As used herein, the singular forms are intended to include the plural forms as well, unless the context clearly indicates otherwise.

It will be further understood that the terms "comprises" and/or "comprising," when used in this specification, specify the presence of stated components, steps, operations, and/or elements, but do not preclude the presence or addition of one or more other components, steps, operations, and/or elements.

Prior to the description of the present specification, some terms used herein will be clarified.

Image alignment, as used herein, denotes outputting a second image by performing image processing, such as rotating, shifting, auto focusing, zooming, cropping, out focusing, etc., on a first image according to a predetermined criterion. For example, the image alignment may denote outputting the second image by performing the image processing based on a person of interest, who satisfies a predetermined criterion, among one or more persons included in the first image. For ease of description, the first image will hereinafter be referred to as an "input image," and the second image will hereinafter be referred to as an "alignment image" or a "result image."

Hereinafter, embodiments of the present disclosure will be described in detail with reference to the attached drawings.

First, an image alignment system according to a first embodiment of the present disclosure will be described with reference to FIGS. 1 through 3.

FIG. 1 illustrates the configuration of an image alignment system according to a first embodiment of the present disclosure. Specifically, FIG. 1 illustrates a smart mirror system as the image alignment system according to the first embodiment.

Referring to FIG. 1, the smart mirror system may be configured to include a smart mirror 200 and a service provision server 300. However, this is merely an exemplary embodiment for achieving the objectives of the present disclosure, and some components can be added or removed as needed. In addition, it should be noted that the components of the smart mirror system illustrated in FIG. 1 are functionally distinct components and that one or more components can be integrated with each other in an actual physical environment. Hereinafter, each component of the smart mirror system will be described.

In the smart mirror system, the smart mirror 200 is a computing device in which a half mirror having a translucent function and a reflection function is disposed at the front, and a display panel is disposed behind the half mirror. It is a computing device that displays an image transmitted through the half mirror when the image is output from the display panel and provides a mirror function when no image is output.

According to an embodiment of the present disclosure, the smart mirror 200 may generate an input image by photographing one or more persons through a camera sensor attached to the front of the smart mirror 200, determine a person of interest among the persons, and perform image alignment on the input image based on the person of interest. In this embodiment only, the smart mirror 200 may also be referred to as an "image alignment device." For ease of understanding, the following description will be given based on the assumption that a plurality of persons or objects are included in an input image. However, the scope of the present disclosure is not limited to this case. That is, even if only one first person appears in an input image, whether the first person is a person of interest may be determined based on whether the first person satisfies a predetermined criterion.

Figure 2A:
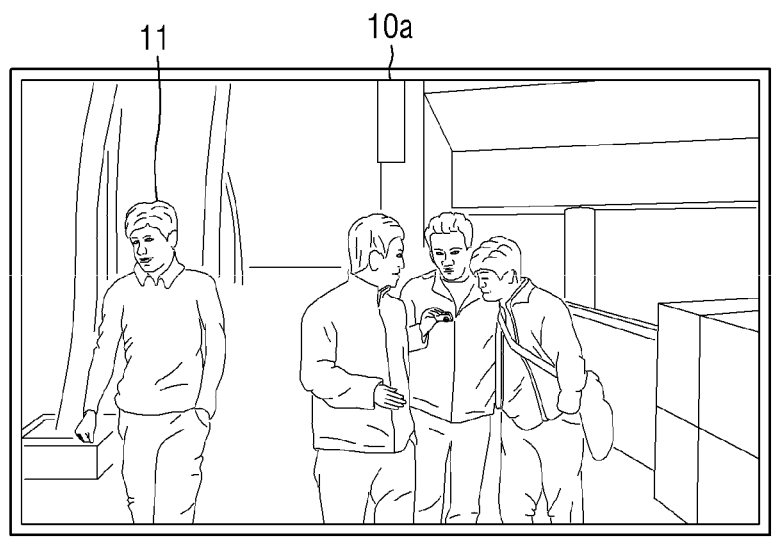
FIGS. 2A and 2B illustrate image alignment which can be referred to in some embodiments of the present disclosure.
Figure 2B:
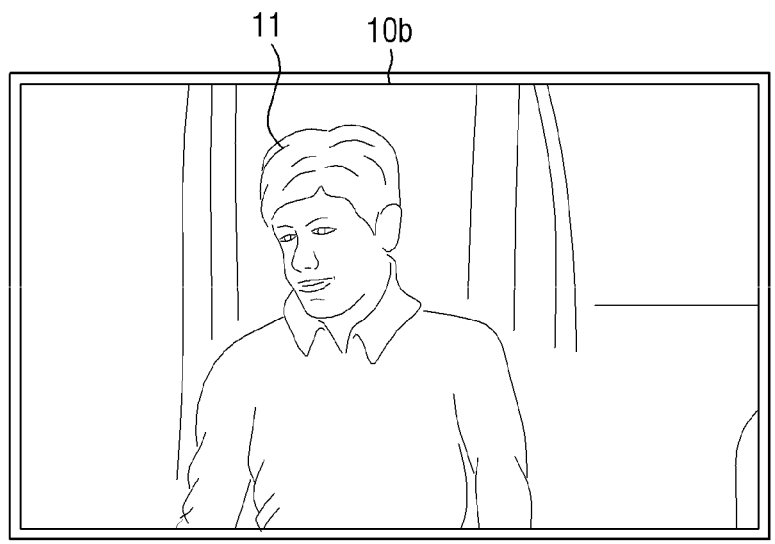

For example, referring to FIGS. 2A and 2B, the smart mirror 200 may determine a person of interest 11 who satisfies a predetermined criterion among a plurality of persons included in an input image 10a and display, in various ways, an alignment image 10b obtained by performing image alignment based on the person of interest 11. FIG. 2B illustrates a case where image processing such as cropping, zooming, etc. has been performed based on the person of interest 11. However, this is merely an example of image alignment, and the image alignment may be performed using various image processing techniques such as rotating, shifting, and out focusing. According to the current embodiment, since an image focused based on a user determined as a person of interest is provided through the smart mirror 200, a sense of immersion of the user can be increased. The current embodiment will be described in detail later with reference to FIGS. 7 through 16.

According to an embodiment of the present disclosure, the smart mirror 200 may configure and display a service provision screen targeted for a user determined as a person of interest. For example, if a person of interest is a child brushing teeth with a toothbrush, the smart mirror 200 may configure and display a screen that provides brushing guide content. Here, the brushing guide content may be content pre-stored in the smart mirror 200 or content received from the service provision server 300. In this embodiment only, the smart mirror 200 may also be referred to as a "service provision device." According to the current embodiment, since a service screen customized for a user is provided, the user's service satisfaction can be improved. The current embodiment will be described in detail later with reference to FIGS. 17 through 20.

According to an embodiment, the smart mirror 200 may extract various metadata through an image analysis of an input image and determine a person of interest based on the metadata. Here, the metadata may include various information such as demographic characteristic information of persons detected in the input image, information about objects carried by the persons, and context information. According to an embodiment, the image analysis may be performed by the service provision server 300, and the smart mirror 200 may receive metadata extracted as a result of the image analysis from the service provision server 300. The current embodiment will be described in detail later with reference to FIGS. 8 through 14.

In the smart mirror system, the service provision server 300 is a computing device that supports the provision of various services based on the smart mirror 200. Here, the computing device may be a notebook computer, a desktop computer, or a laptop computer. However, the computing device is not limited to the above examples and may be any type of device having a computing function and a communication function.

The service provision server 300 may perform an image analysis of an input image received from the smart mirror 200 or provide content customized for a person of interest. For example, if a person of interest is a child holding a toothbrush, the service provision server 300 may provide brushing guide content. For another example, if the person of interest is a woman receiving a hairstyling service, the service provision server 300 may provide various hairstyle content to the smart mirror 200.

The components of the smart mirror system illustrated in FIG. 1 may communicate through a network. Here, the network may be implemented as any type of wired/wireless communication network such as a local area network (LAN), a wire area network (WAN), a mobile radio communication network, or wireless broadband Internet (Wibro).

The configuration and operation of the smart mirror 200 which is a component of the smart mirror system will now be described in more detail.

Figure 3:
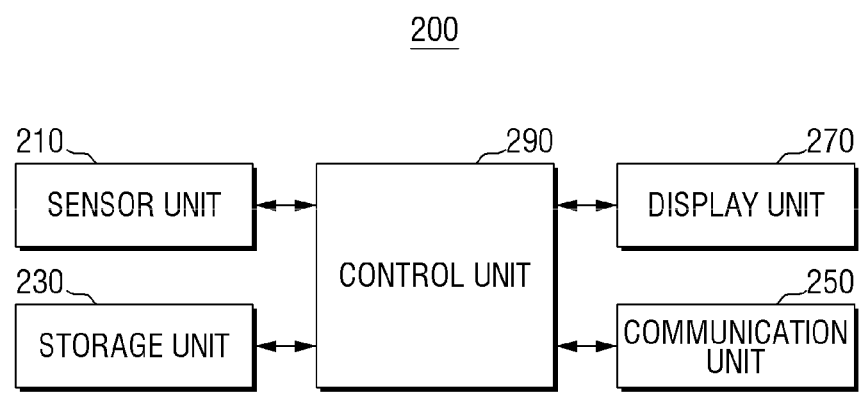
FIG. 3 is a block diagram of a smart mirror 200 which is a component of the image alignment system according to the first embodiment.

FIG. 3 is an example block diagram of the smart mirror 200.

Referring to FIG. 3, the smart mirror 200 may be configured to include a sensor unit 210, a storage unit 230, a communication unit 250, a display unit 270, and a control unit 290. In FIG. 3, only the components related to the embodiment of the present disclosure are illustrated. Therefore, it will be understood by those of ordinary skill in the art to which the present disclosure pertains that other general-purpose components can be included in addition to the components illustrated in FIG. 3.

As for each component, the sensor unit 210 may include a camera sensor which is attached to the front of the smart mirror 200 and captures an image of a surrounding area and/or a proximity sensor which detects the approach of an object. For example, the camera sensor may be controlled by the control unit 290 to capture an image only when the approach of a predetermined object is detected by the proximity sensor.

The storage unit 230 may non-temporarily store one or more computer programs for performing various operations of the smart mirror 200. The storage unit 230 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

The communication unit 250 performs data communication with other components of the smart mirror system. To this end, the communication unit 250 may include a wired Internet module, a mobile communication module, or a wireless communication module.

The display unit 270 displays a result image obtained as a result of performing image alignment based on a person of interest. Alternatively, the display unit 270 displays a service provision screen configured for a person of interest. To this end, the display unit 270 may be configured to include a display module such as a liquid crystal display (LCD) panel widely known in the art.

In addition, the display unit 270 may be configured to include a mirror disposed at the front and including a mirror function of reflecting light from the outside to reflect an object. The mirror may also provide an image display function of transmitting an image signal from the display module to the outside. For example, the mirror may be a half mirror. The half mirror acts like a mirror when a light source of the display module is turned off and displays an image of the display module by transmitting the image when the light source is turned on.

The display module may be the same size as the mirror or may have a smaller size than the mirror such that light can be transmitted through only a part of the mirror. In the latter case, the mirror may be divided into a first mirror area that provides only a mirror function and a second mirror area that provides a mirror function or an image display function.

The control unit 290 controls the overall operation of each component of the smart mirror 200. The control unit may include a central processing unit (CPU), a micro-processor unit (MPU), a micro-controller unit (MCU), or any form of processor well known in the art to which the present disclosure pertains. In addition, the control unit 290 may perform an operation on at least one application or program for executing methods according to embodiments of the present disclosure to be described later.

Specifically, the control unit 290 may perform an image alignment method according to an embodiment of the present disclosure to determine a person of interest in an input image, perform image alignment based on the person of interest, and display an alignment image. The image alignment method will be described in detail later with reference to FIGS. 7 through 16.

The control unit 290 may perform a method of configuring a user-targeted service provision screen according to an embodiment of the present disclosure in order to determine a person of interest in an input image and configure a service provision screen targeted for the person of interest. The method of configuring a service provision screen will be described in detail later with reference to FIGS. 17 through 20.

Each component of FIG. 3 may mean, but is not limited to, a software or hardware component such as a Field Programmable Gate Array (FPGA) or Application Specific Integrated Circuit (ASIC). A component may advantageously be configured to reside on the addressable storage medium and configured to execute on one or more processors. The functionality provided for in the components may be further separated into additional components or combined into fewer components.

Until now, the smart mirror system which is the image alignment system according to the first embodiment of the present disclosure has been described with reference to FIGS. 1 through 3. Next, an image alignment system according to a second embodiment of the present disclosure will be described with reference to FIGS. 4 through 6.

Figure 4:
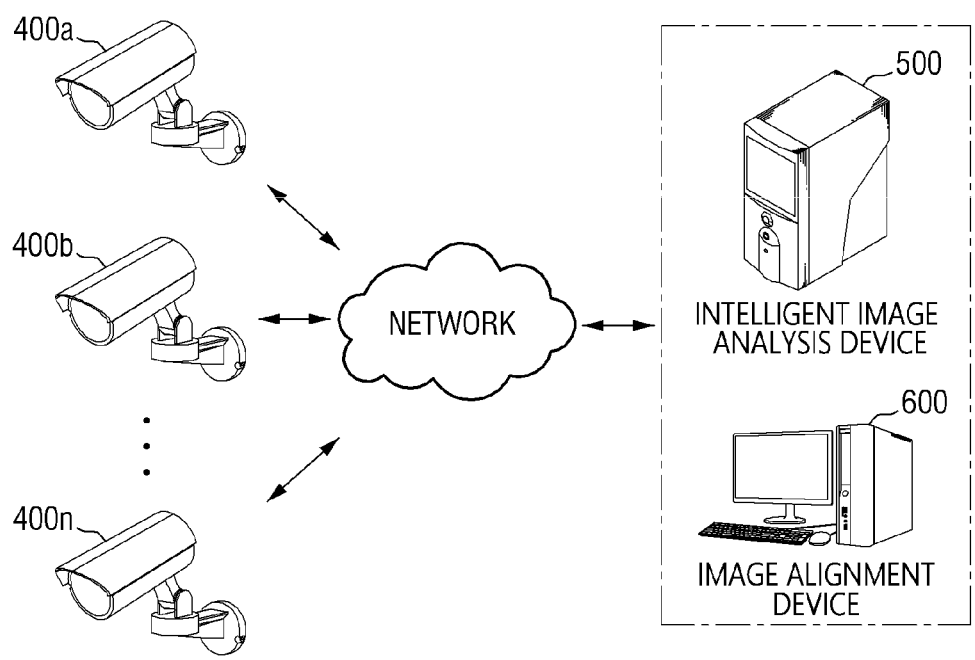
FIG. 4 illustrates the configuration of an image alignment system according to a second embodiment of the present disclosure.

FIG. 4 illustrates the configuration of an image alignment system according to a second embodiment of the present disclosure. Specifically, FIG. 4 illustrates an intelligent video surveillance system as the image alignment system according to the second embodiment.

Referring to FIG. 4, the intelligent video surveillance system may be configured to include a plurality of image capturing devices 400a through 400n, an intelligent image analysis device 500, and an image alignment device 600. However, this is merely an exemplary embodiment for achieving the objectives of the present disclosure, and some components can be added or removed as needed. In addition, it should be noted that the components of the intelligent video surveillance system illustrated in FIG. 4 are functionally distinct components and that one or more components can be integrated with each other in an actual physical environment. Hereinafter, each component of the intelligent video surveillance system will be described.

In the intelligent video surveillance system, each of the image capturing devices 400a through 400n is a device that generates a surveillance image by photographing a designated surveillance area. The surveillance image generated by each of the image capturing devices 400a through 400n is transmitted to the intelligent image analysis device 500. Each of the image capturing devices 400a through 400n may be, but is not limited to, a closed-circuit television (CCTV).

In the intelligent video surveillance system, the intelligent image analysis device 500 performs intelligent image analysis based on a surveillance image provided by each of the image capturing devices 400a through 400n. For example, the intelligent image analysis device 500 may detect an object of interest through an analysis of the surveillance image and perform recognition, tracking, etc. of the object of interest.

In addition, the intelligent image analysis device 500 may detect various events set by an administrator through processes such as detection, recognition, tracking, etc. of the object of interest. For example, the intelligent image analysis device 500 may detect various events such as violation of traffic laws, recognition of a wanted criminal, recognition of a missing child, etc.

In the intelligent video surveillance system, the image alignment device 600 is a computing device that performs image alignment using a surveillance image provided by each of the image capturing devices 400a through 400n as an input image and displays a resultant image. Here, the computing device may be a notebook computer, a desktop computer, or a laptop computer. However, the computing device is not limited to the above examples and may be any type of device having a computing function and a communication function.

In the intelligent video surveillance system, the image alignment device 600 may be implemented as an integrated control device. In this case, the image alignment device 600 may provide a user interface for setting events to be detected, the analysis result of the intelligent image analysis device 500, a surveillance image obtained by each of the image capturing devices 400a through 400n, etc. to the administrator.

According to an embodiment of the present disclosure, the image alignment device 600 may determine a person of interest among one or more persons recognized in a surveillance image and perform image alignment on the surveillance image based on the person of interest.

Figure 5A:
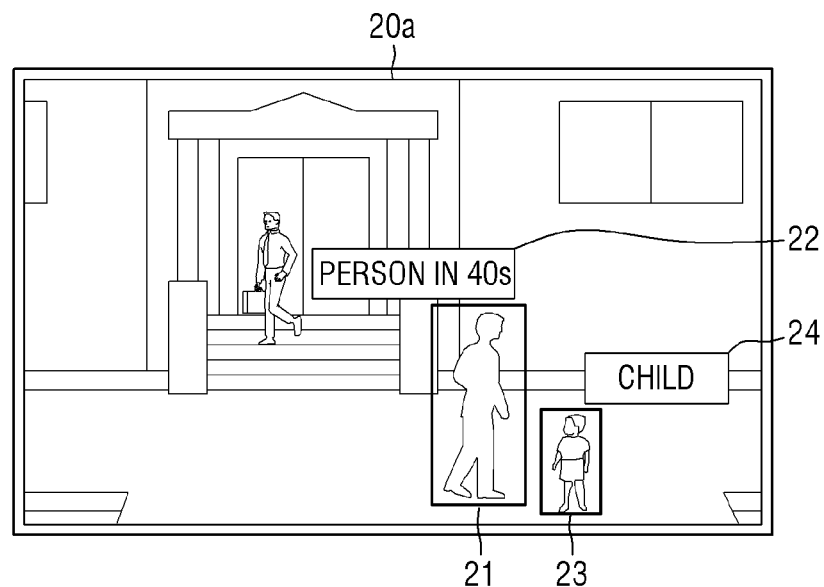
FIGS. 5A and 5B illustrate image alignment which can be referred to in some embodiments of the present disclosure.
Figure 5B:
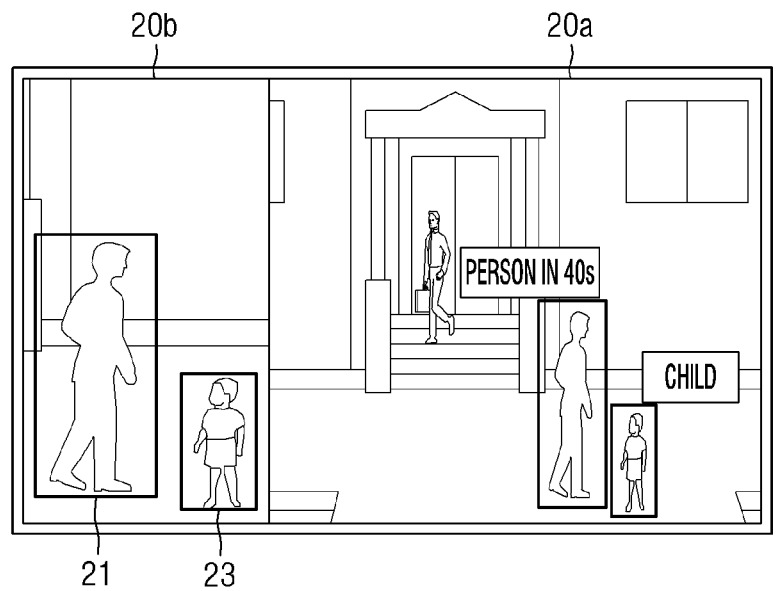

For example, referring to FIGS. 5A and 5B, the image alignment device 600 may determine persons of interest 21 and 23 who satisfy a predetermined criterion among a plurality of persons included in a surveillance image 20a and display an image 20b obtained by performing image alignment based on the persons of interest 21 and 23. In particular, FIG. 5A illustrates an example in which when a condition that an adult male should appear around an infant for a predetermined period of time or more is set as an event to be detected in a surveillance area where infant kidnapping incidents occur frequently, an infant 23 and an adult male 21 meeting the condition are determined as persons of interest. In addition, FIG. 5B illustrates an example in which the alignment image 20b obtained by performing image alignment based on the infant 23 and the adult male 21 determined as persons of interest and the surveillance image 20a are displayed in different areas of the screen, respectively. Like this, the image alignment device 600 may determine a person of interest based on a certain context and automatically generate an alignment image.

A method by which the image alignment device 600 performs image alignment and a method by which the image alignment device 600 displays an alignment image will be described in detail later with reference to FIGS. 7 through 16.

The components of the intelligent video surveillance system illustrated in FIG. 4 may communicate through a network. Here, the network may be implemented as any type of wired/wireless communication network such as a LAN, a WAN, a mobile radio communication network, or Wibro.

The configuration and operation of the image alignment device 600 which is a component of the intelligent video surveillance system will now be described with reference to FIG. 6.

Figure 6:
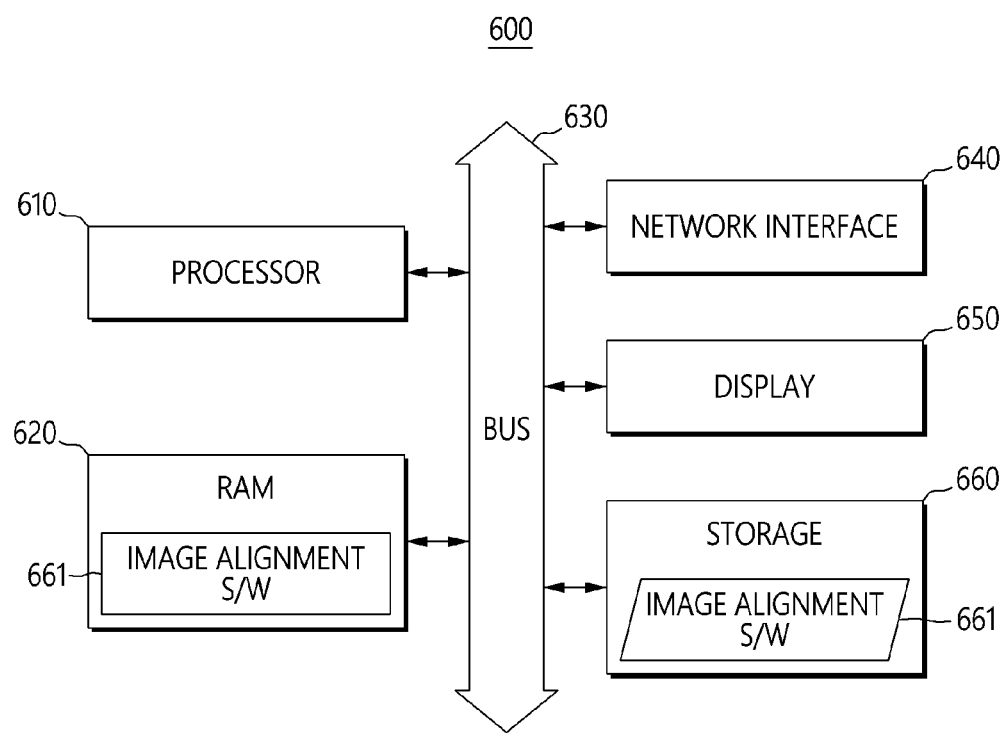
FIG. 6 illustrates the hardware configuration of an image alignment device 600.

FIG. 6 illustrates the hardware configuration of the image alignment device 600.

Referring to FIG. 6, the image alignment device 600 may include one or more processors 610, a bus 630, a network interface 640, a display 650, a memory 620 which loads a computer program to be executed by the processors 610, and a storage 660 which stores image alignment software 661. In FIG. 6, only the components related to the embodiment of the present disclosure are illustrated. Therefore, it will be understood by those of ordinary skill in the art to which the present disclosure pertains that other general-purpose components can be included in addition to the components illustrated in FIG. 6.

The processors 610 control the overall operation of each component of the image alignment device 600. The processors 610 may include a CPU, an MPU, an MCU, a graphic processing unit (GPU), or any form of processor well known in the art to which the present disclosure pertains. In addition, the processors 610 may perform an operation on at least one application or program for executing methods according to embodiments of the present disclosure. The image alignment device 600 may include one or more processors.

The memory 620 stores various data, commands and/or information. The memory 620 may load one or more programs 661 from the storage 660 in order to execute image alignment methods according to embodiments of the present disclosure. In FIG. 6, a random access memory (RAM) is illustrated as an example of the memory 620.

The bus 630 provides a communication function between the components of the image alignment device 600. The bus 630 may be implemented as various forms of buses such as an address bus, a data bus, and a control bus.

The network interface 640 supports wired/wireless Internet communication of the image alignment device 600. In addition, the network interface 640 may support various communication methods other than Internet communication. To this end, the network interface 640 may include a communication module well known in the art to which the present disclosure pertains.

The storage 660 may non-temporarily store the programs 161. In FIG. 6, the image alignment software 661 is illustrated as an example of the programs 161.

The storage 660 may include a non-volatile memory such as a ROM, an EPROM, an EEPROM or a flash memory, a hard disk, a removable disk, or any form of computer-readable recording medium well known in the art to which the present disclosure pertains.

The image alignment software 661 may execute an image alignment method according to an embodiment of the present disclosure. For example, the image alignment software

661 may be loaded into the memory 620 and executed by the processors 610 to perform an operation of recognizing one or more persons in an input image, an operation of determining a person of interest among the recognized persons, and an operation of performing image alignment on the input image based on the person of interest, wherein the image alignment is performed without input from a user of the image alignment device for the image alignment.

For reference, the hardware configuration of a service provision device according to an embodiment of the present disclosure may also be implemented as illustrated in FIG. 6. In this case, a storage of the service provision device may store a computer program for executing a method of configuring a user-targeted service provision screen, and the computer program may be loaded into a memory and executed by a processor.

Until now, the intelligent video surveillance system which is the image alignment system according to the second embodiment of the present disclosure has been described with reference to FIGS. 4 through 6. Next, an image alignment method according to an embodiment of the present disclosure will be described with reference to FIGS. 7 through 16.

Each operation of the image alignment method according to the embodiment of the present disclosure to be described below may be performed by a computing device. For example, the computing device may be the image alignment device 200 or 600. However, the subject of each operation included in the image alignment method may be omitted for ease of description. In addition, each operation of the image alignment method may be implemented as an operation performed by the image alignment device 200 or 600 as image alignment software is executed by a processor.

Figure 7:
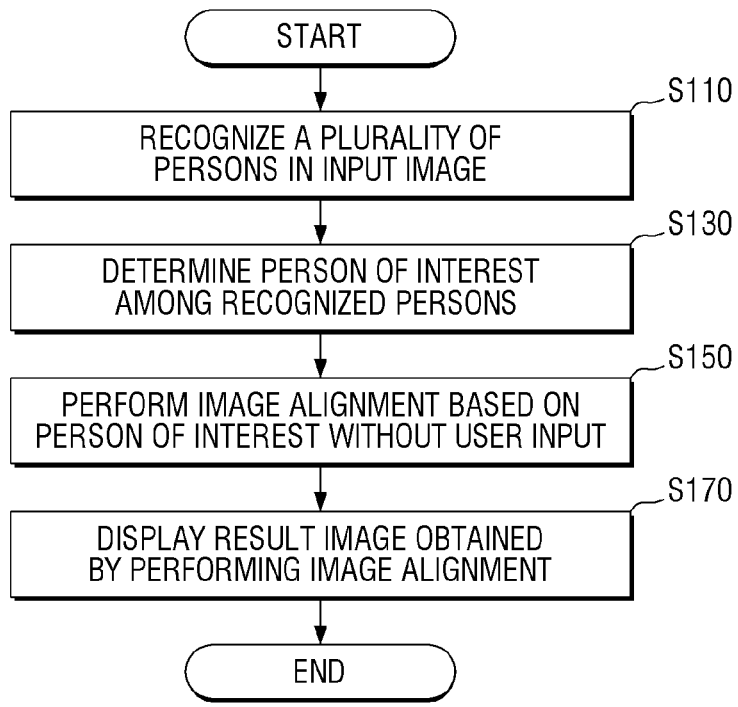
FIG. 7 is a flowchart illustrating an image alignment method according to an embodiment of the present disclosure.

FIG. 7 is a flowchart illustrating an image alignment method according to an embodiment of the present disclosure. However, this is merely an exemplary embodiment for achieving the objectives of the present disclosure, and some operations can be added or removed as needed. For ease of understanding, the following description will also be given based on the assumption that a plurality of persons are included in an input image. However, the scope of the present disclosure is not limited to this case as described above.

Referring to FIG. 7, first, a plurality of persons are recognized in an input image (operation S110). To recognize the persons, at least one image processing algorithm or image analysis algorithm widely known in the art may be used.

Next, a person of interest is determined among the recognized persons (operation S130). The person of interest may be determined based on at least one of, for example, demographic characteristic information of the recognized persons, information about objects carried by the recognized persons, and context information. The current operation (S130) will be described in detail later with reference to FIGS. 8 through 14.

Next, image alignment is performed based on the person of interest without user input (operation S150). As described above, the image alignment may be performed using various image processing techniques such as rotating, shifting, cropping, and zooming.

Next, a result image obtained by performing the image alignment is displayed (operation S170). A method of displaying the result image may vary depending on embodiments. The current operation (operation S170) will be described in detail with reference to FIGS. 15 and 16.

Until now, the image alignment method according to the embodiment of the present disclosure has been described with reference to FIG. 7. According to the above-described method, a person of interest may be determined based on a predetermined criterion, and a result image obtained by automatically performing image alignment based on the person of interest may be provided. Accordingly, a sense of immersion of a user provided with the image can be increased, and the convenience of the user can also be improved because no intervention of the user is required.

Methods of determining a person of interest in operation S130 will now be described in detail with reference to FIGS. 8 through 14.

In an embodiment, a person of interest may be determined based on demographic characteristic information of recognized persons. That is, a person who has characteristics matching pre-specified demographic information among a plurality of persons recognized in an input image may be determined as a person of interest. Here, the demographic characteristic information may include, for example, gender, age, nationality, and ethnicity.

For ease of description, a specific example of determining a person of interest based on demographic characteristic information will be described with reference to FIG. 8.

Figure 8:
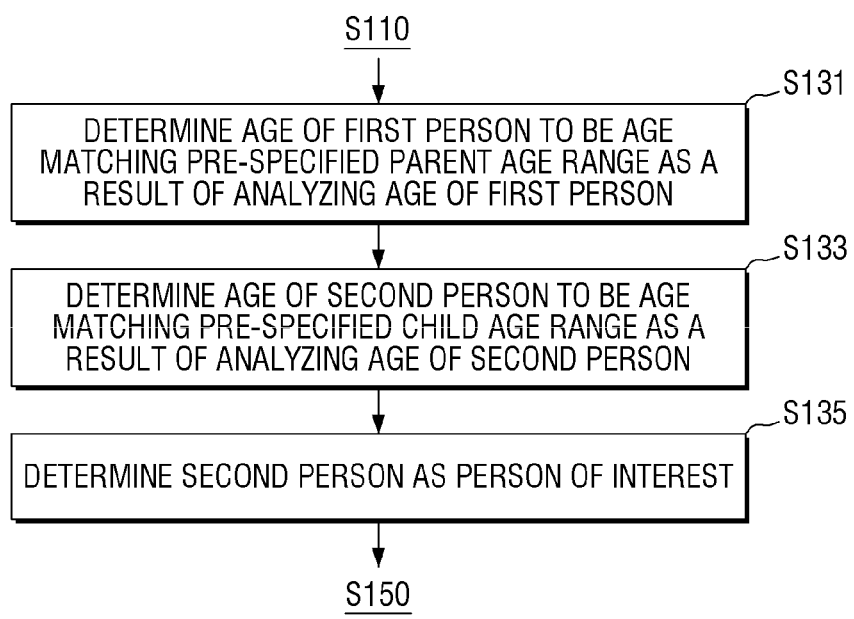
FIGS. 8 through 14 are diagrams for explaining methods of determining person of interest according to embodiments of the present disclosure.

Referring to FIG. 8, an age of a first person may be determined to be an age matching a pre-specified parent age range as a result of analyzing the age of the first person among a plurality of recognized persons (operation S131), and an age of a second person may be determined to be an age matching a pre-specified child age range as a result of analyzing the age of the second person among the recognized persons (operation S133). In this case, the second person may be determined as a person of interest (operation S135). That is, when an input image includes a parent and a child, the child may be determined as a person of interest.

Figure 9A:
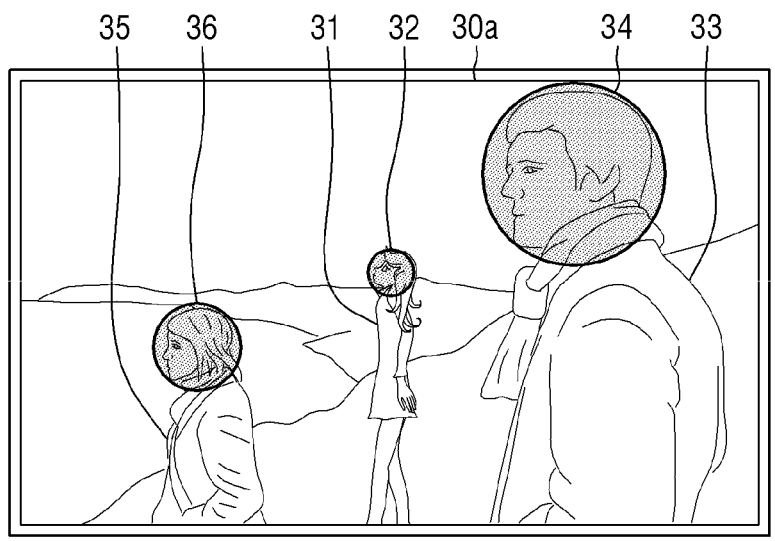
Figure 9B:
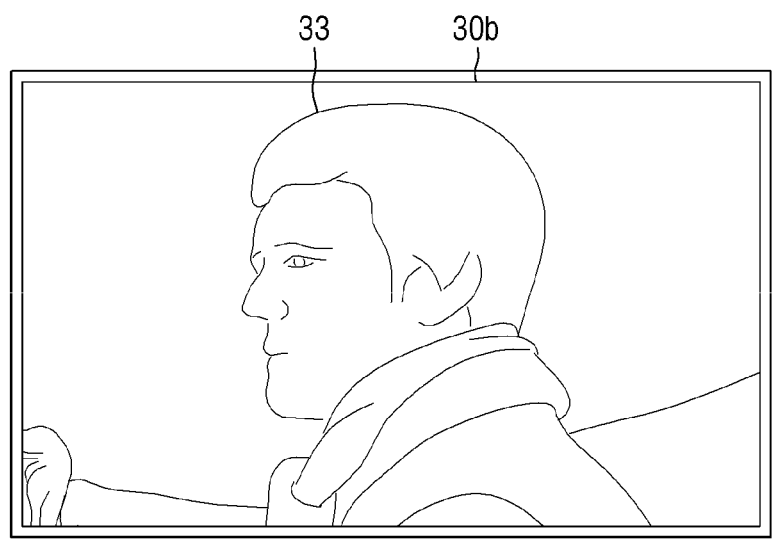

In an embodiment, referring to FIGS. 9A and 9B, a person of interest may be determined based on a size of a face area. Specifically, face areas 32, 34 and 36 may respectively be extracted from a plurality of persons 31, 33 and 35 recognized in an input image 30a, and a person 33 having a largest face area among the extracted face areas 32, 34 and 36 of the recognized persons 31, 33 and 35 may be determined as a person of interest. In addition, a result image 30b obtained by performing image alignment based on the person of interest 33 may be provided. According to the current embodiment, since a person located near the smart mirror 200 is determined as a person of interest, the smart mirror 200 may operate to provide a predetermined service to each person in order of position.

In an embodiment, a person with a pre-specified object of interest among a plurality of recognized persons may be determined as a person of interest. Here, the object of interest may be variously specified according to the purpose of the system, for example, may be a user terminal, a smart toothbrush, or a weapon such as a knife or a pistol. Specifically, an object having the shape of a specified object of interest may be detected at a specified position on each of a plurality of recognized persons, and, if the object having the shape of the specified object of interest is detected at the specified position on a first person among the recognized persons, the first person may be determined as the person of interest. Here, if the specified object of interest is an object having the shape of a toothbrush, the specified position may be a position corresponding to fingertips of a person.

Figure 10A:
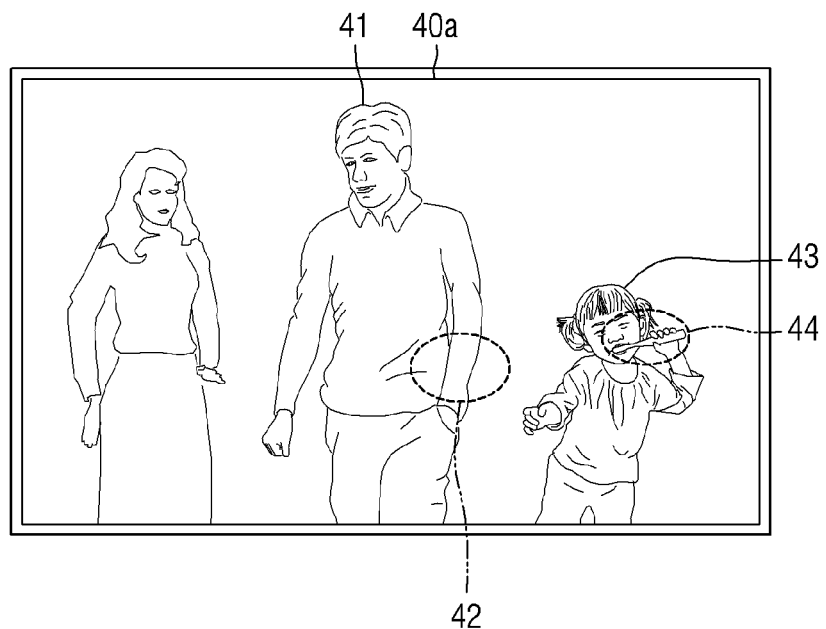
Figure 10B:
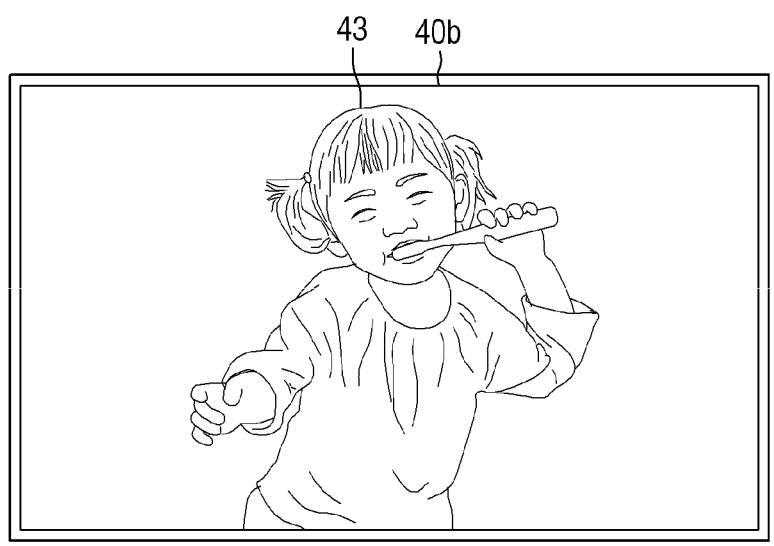

For ease of understanding, the current embodiment will be further described with reference to FIGS. 10A and 10B. If a specified object of interest is a toothbrush or a smart toothbrush, it is determined whether an object having the shape of a toothbrush is detected at fingertips of a plurality of persons 41 and 43 recognized in an input image 40*a*. If it is determined that an object 44 having the shape of a toothbrush has been detected at fingertips of a first person 43, a result image 40*b* obtained by performing image alignment based on the first person 43 is provided as illustrated in FIG. 10B.

In the above-described embodiment, there may be a case where a plurality of persons have a specified object of interest. In this case, at least one person may be determined as a person of interest according to various criteria.

For example, at least one person located nearby may be determined as a person of interest based on the size of a face area.

For another example, a person of interest may be determined based on the order of appearance in an input image. Specifically, if an object having the shape of a specified object of interest is detected at a specified position on a first person and is also detected at the specified position on a second person, a person who appears first in the input image among the first person and the second person may be determined as the person of interest. A plurality of persons can also be determined as persons of interest according to the order of appearance.

For another example, a person located in a pre-specified direction among a plurality of persons with a specified object of interest may be determined as a person of interest. Specifically, if an object having the shape of a specified object of interest is detected at a specified position on a first person and is also detected at the specified position on a second person, a person located in a pre-specified direction among the first person and the second person may be determined as the person of interest. According to the current example, when a smart mirror is installed above a wash basin of a kindergarten, if a plurality of kindergarteners appear from the right, brush their teeth according to brushing guide content, and then exit to the left, a brushing guide service based on image alignment may be provided to each kindergartner according to the order of appearance.

In an embodiment, a person on which a specified object of interest has been detected at a specified position among a plurality of persons with the specified object of interest may be determined as a person of interest. Here, the specified position may vary according to the type of object of interest. For ease of understanding, the current embodiment will be further described with reference to FIG. 11 by using a case where the object of interest is a smart toothbrush as an example.

Figure 11:
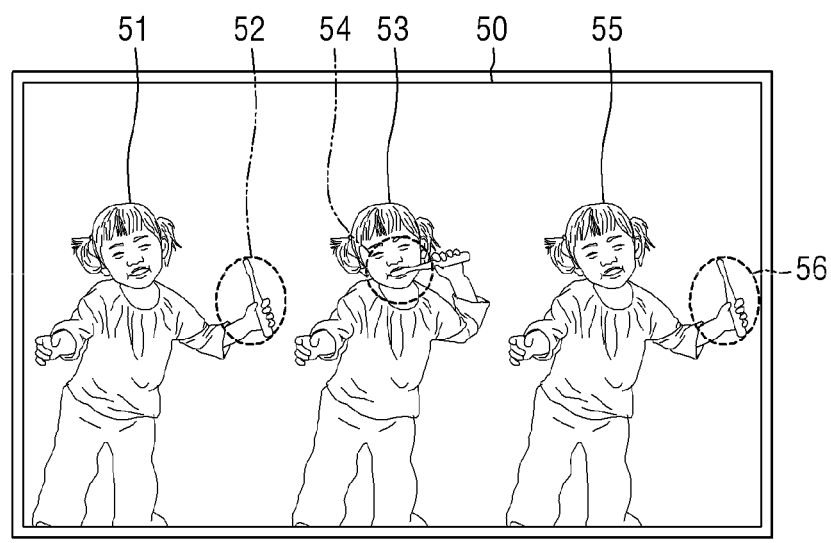

Referring to FIG. 11, of a plurality of children 51, 53 and 55 at whose fingertips smart toothbrushes 52, 54 and 56 have been detected, a child 53 whose smart toothbrush has been detected around her mouth may be determined as a person of interest. Accordingly, the smart mirror 200 may operate to provide a result image obtained by automatically performing image alignment and brushing guide content to a child who starts to brush teeth first among children provided with a brushing guide service through the smart mirror 200.

Figure 12:
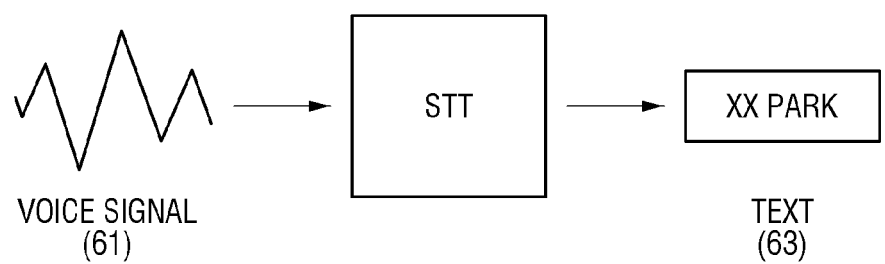

In some embodiments, referring to FIG. 12, voice recognition may be performed on a voice contained in an input image or a voice signal 61 detected by a separate voice sensor, and a person of interest may be determined using text 63 produced through the voice recognition. Some embodiments based on voice recognition will now be described.

Figure 13:
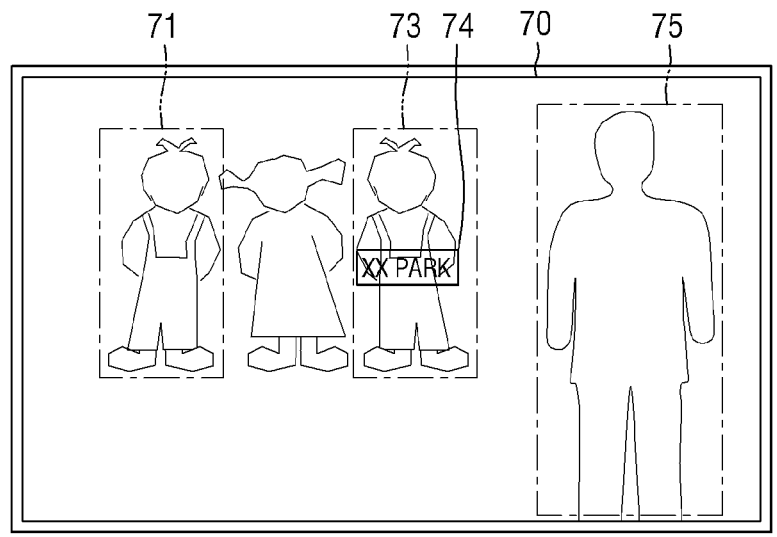
Figure 14:
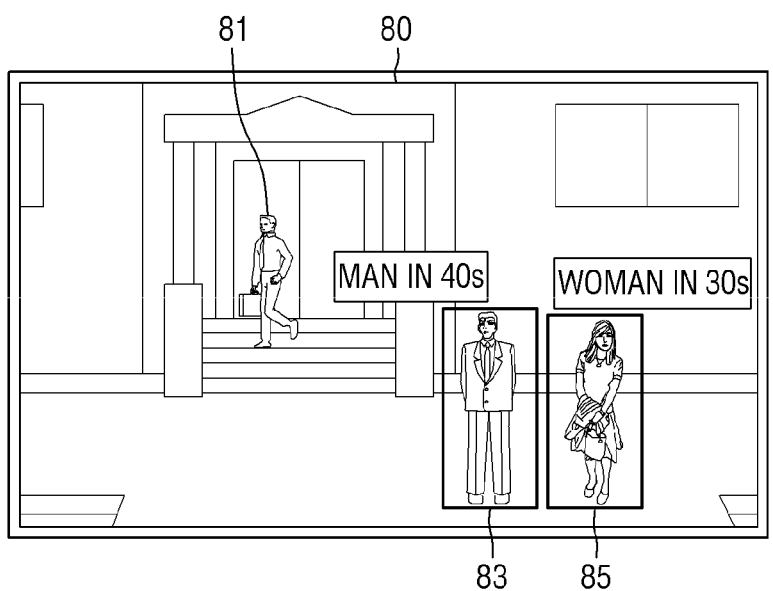
Figure 15:
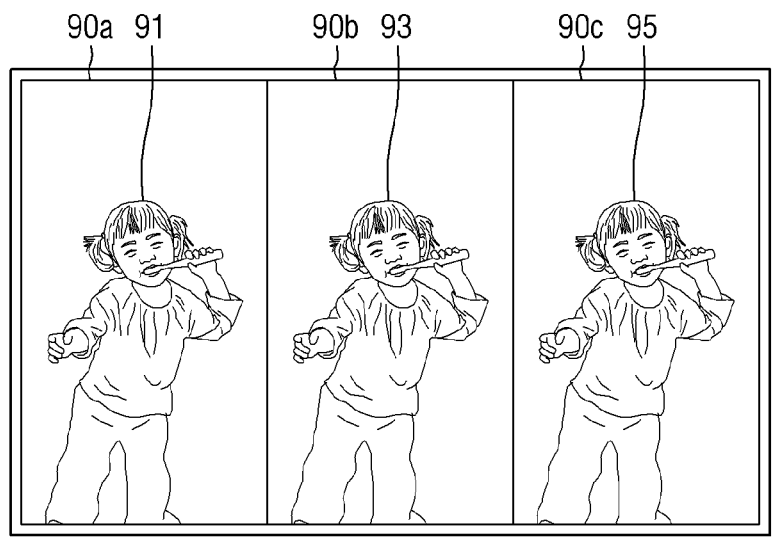
FIGS. 15 and 16 are diagrams for explaining methods of displaying a result image obtained by performing image alignment according to embodiments of the present disclosure.
Figure 16:
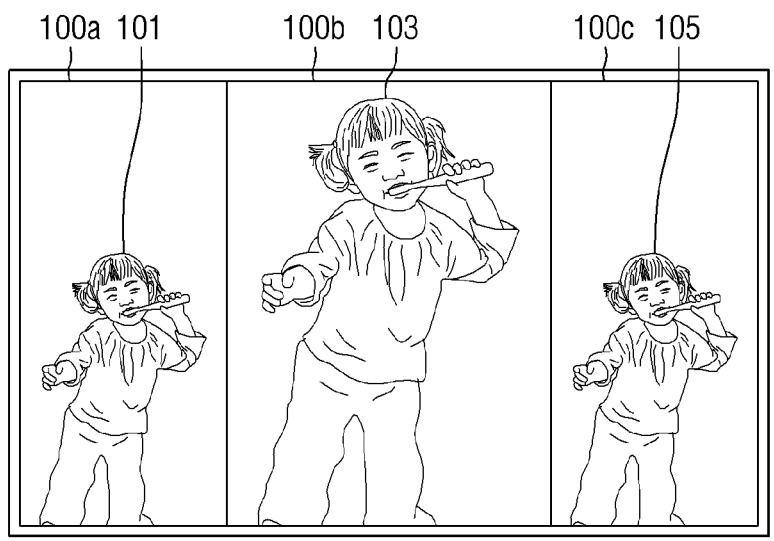

In an embodiment, when text corresponding to a recognized voice is detected in an area inside the outline of a first person, the first person may be determined as a person of interest. This embodiment will be further described with reference to FIG. 13 by using a case where a teacher calls a first child among a plurality of children wearing name tags as an example. Referring to FIG. 13, when text indicating the name of a first child is obtained by recognizing a voice signal for calling the first child, it may be determined whether the obtained text is detected in areas 71, 73 and 75 inside the outlines of a plurality of persons included in an input image 70. If the same text 74 as the obtained text is detected in the area 73 inside the outline of the first child among the persons, the first child may be determined as a person of interest. Accordingly, a result image obtained by performing image alignment based on a child wearing a name tag of a called name among a plurality of children may be provided.

In an embodiment, when text corresponding to a recognized voice is the name of a first person, face recognition may be performed on each of a plurality of recognized persons, and the first person among the recognized persons may be determined as a person of interest based on the result of the face recognition. Specifically, when the name of the first person is obtained as text through voice recognition, face recognition is performed on each of a plurality of recognized persons using a pre-established face database (DB) including name information and face images of persons. Then, a person whose face is recognized as a face corresponding to the name of the first person among the recognized persons is determined as a person of interest. According to the current embodiment, image alignment is performed based on a specific person whose name has been called, which may be utilized in various cases. For example, when a parent of a missing child is searching for the child while calling the name of the child in a surveillance area, image alignment may be automatically performed on an image containing the child among surveillance images. Therefore, the current embodiment can be utilized in a missing child search service. For another example, when the police are chasing a wanted criminal while calling the name of the wanted criminal in a surveillance area, image alignment may be automatically performed on an image containing the wanted criminal among surveillance images. Therefore, the current embodiment can be utilized in a wanted criminal arrest service.

In some embodiments, a person of interest corresponding to a current context may be determined though context-based person of interest determination logic performed on each of a plurality of recognized persons. Here, context information used in the context-based person of interest determination logic may include weather, time, place, and a combination of demographic characteristics.

In an embodiment, a context may be determined based on a combination of demographic characteristics of a plurality of recognized persons, and persons who meet a condition according to the determined context may be determined as persons of interest. For example, referring to FIG. 14, persons 83 and 85 composed of a combination of a man in his forties and a woman in her thirties among a plurality of recognized persons 81, 83 and 85 may be determined as persons of interest. Alternatively, persons who meet conditions according to various combinations of a parent and a child, a man and a man, a man and a woman, etc. may be determined as persons of interest.

Until now, the methods of determining a person of interest, which can be referred to in some embodiments of the present disclosure, have been described with reference to FIGS. 8 through 14. Next, methods of displaying, in operation S170, a result image obtained by performing image alignment based on a person of interest will be described.

In an embodiment, an image in which a person of interest or a person meeting a specified condition among persons of interest has been highlighted may be displayed. Here, the highlighting may include all image processing techniques for making a person of interest stand out, such as bounding box processing and coloring a person of interest in black-and-white surroundings. More specifically, for example, when a brushing guide service is provided through the smart mirror 200, a result image in which a first child brushing teeth has been colored and a child not starting to brush teeth has been processed in black and white may be provided.

In an embodiment, predetermined additional information about a person of interest may be further displayed. For example, when an action meeting a specified condition is detected from a person of interest, information about a period of time during which the action is performed may be displayed around the person of interest. More specifically, for example, information such as a period of time during which a child is brushing teeth or a period of time during which a person suspected of being a kidnapper hangs around an infant may be displayed around the person of interest. Moreover, various information such as demographic characteristic information of a person of interest may be further displayed around the person of interest.

In an embodiment, when a plurality of persons of interest are determined, a first result image obtained by performing image alignment based on a first person of interest may be displayed in a first area, and a second result image obtained by performing image alignment based on a second person of interest may be displayed in a second area. For example, referring to FIG. 15, when a plurality of children 91, 93 and 95 brushing their teeth are determined as persons of interest, image alignment may be performed based on each of the children 91, 93 and 95, and result images may be displayed in areas 90*a*, 90*b* and 90*c*, respectively.

In the above-described embodiment, the size of an area may be dynamically adjusted according to a predetermined score or priority. For example, referring to FIG. 16, when a plurality of children 101, 103 and 105 are brushing their teeth, sizes of areas 100*a*, 100*b* and 100*c* may be adjusted based on a brushing score of each child. In particular, in FIG. 16, the brushing score is highest for a second child 63 followed by a first child 61 and then a third child 65. Here, the brushing score may be calculated in various ways based on information received from a smart toothbrush used by each child 101, 103 or 105, image analysis information (e.g., calculated based on the degree to which a content image and a captured image match) indicating whether brushing is performed according to brushing guide content when the brushing guide content is provided, a brushing time, etc. According to the current example, children may be induced to brush their teeth correctly by stimulating their competitive spirit.

Until now, the image alignment method according to the embodiment of the present disclosure has been described with reference to FIGS. 7 through 16. Next, methods of configuring a user-targeted service provision screen according to embodiments of the present disclosure will be described with reference to FIGS. 17 through 20.

Each operation of the methods of configuring a service provision screen which will be described below may be performed by a computing device. For example, the computing device may be a service provision device. However, the subject of each operation included in the methods of configuring a service provision screen may be omitted for ease of description. In addition, each operation of the methods of configuring a service provision screen may be an operation performed by the service provision device as software for configuring a user-targeted service provision screen is executed by a processor.

First, a method of configuring a user-targeted service provision screen according to a first embodiment of the present disclosure will be described with reference to FIGS. 17 through 19B.

Figure 17:
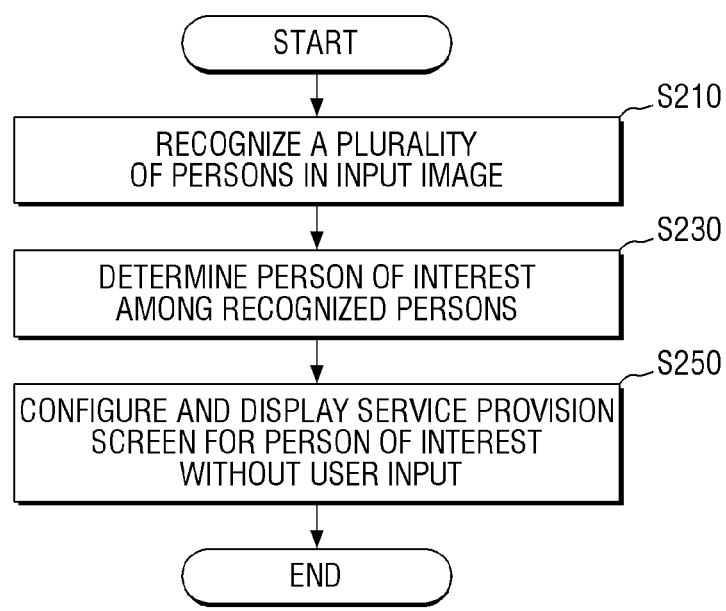
FIGS. 17 through 19B are diagrams for explaining a method of configuring a user-targeted service provision screen according to a first embodiment of the present disclosure.

FIG. 17 is a flowchart illustrating the method of configuring a user-targeted service provision screen according to the first embodiment. However, this is merely an exemplary embodiment for achieving the objectives of the present disclosure, and some operations can be added or removed as needed. For ease of understanding, the following description will also be given based on the assumption that a plurality of persons are included in an input image. However, the scope of the present disclosure is not limited to this case as described above.

Referring to FIG. 17, a plurality of persons are recognized in an input image (operation S210), and a person of interest is determined among the recognized persons (operation S230). Operations S210 and S230 are the same as operations S110 and S130 described above, and thus a redundant description thereof is omitted.

Next, a service provision screen for the person of interest is configured and displayed without user input (operation S250). For example, when the person of interest is a child with a smart toothbrush, brushing guide content may be displayed to provide a brushing guide service.

Figure 18A:
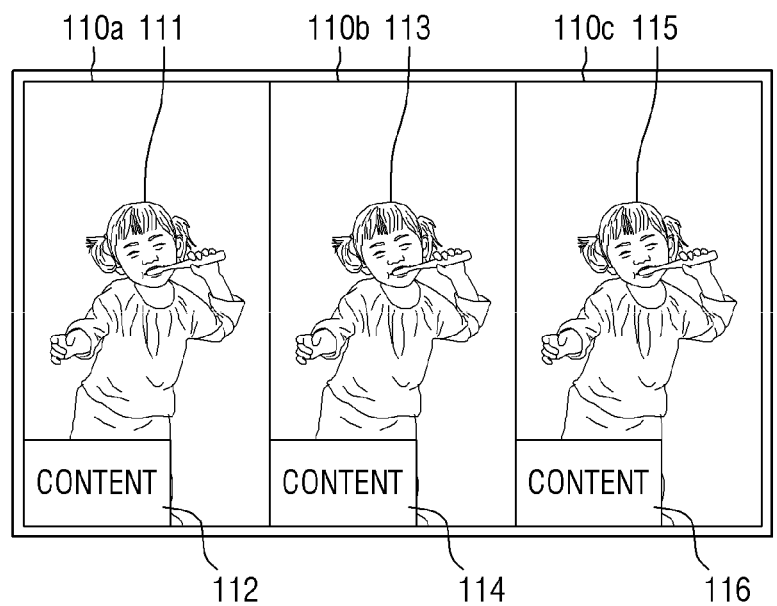

In an embodiment, a service provision screen may be configured as illustrated in FIG. 18A. Specifically, when there are a plurality of persons of interest 111, 113 and 115, a service provision screen may be configured such that result images obtained by performing image alignment based on the persons of interest are displayed in areas 110*a*, 110*b* and 110*c*, respectively, and pieces of content for the persons of interest are displayed in parts 112, 114 and 116 of the areas 110*a*, 110*b* and 110*c*, respectively. According to an embodiment, the result images may not be displayed, and the pieces of content may be displayed in the areas 110*a*, 110*a* and 110*c*, respectively.

Figure 18B:
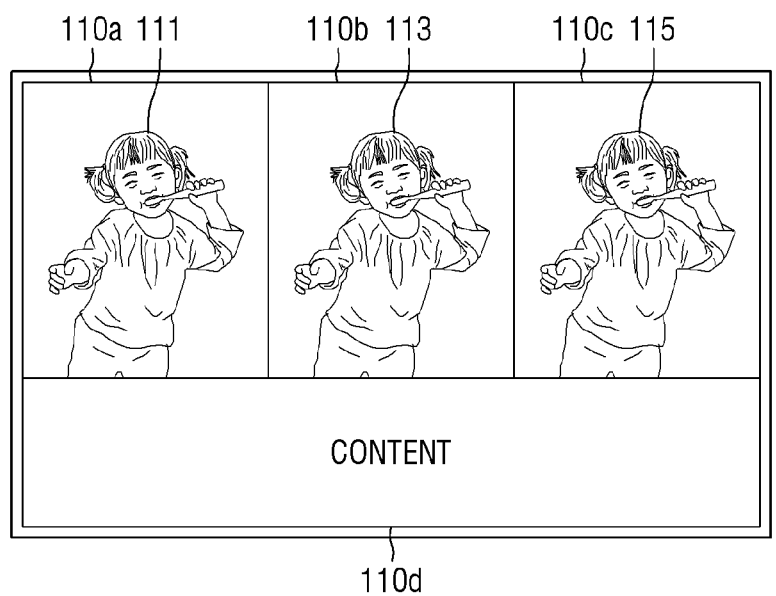

In an embodiment, referring to FIG. 18B, when common content is provided to a plurality of persons of interest 111, 113 and 115, the common content may be displayed in a new area 110*d*. In FIG. 18B, the new area 110*d* is located at the bottom. However, the size and position of the new area 110*d* can vary according to the resolution of content or the like.

According to an embodiment of the present disclosure, a service provision screen may be configured using data received from a user terminal of a person of interest. In more detail, when a person detected to have an object having the shape of a user terminal or a specified object is determined as a person of interest, identification information (e.g., ID, name, etc.) of the person of interest may be obtained from a pre-established face DB or an identification information DB. Then, information about the user terminal possessed by the person of interest may be queried using the identification information, and predetermined content may be received from the user terminal using the information about the user terminal to configure a service provision screen. Here, the information about the user terminal which corresponds to the identification information may be pre-stored information. For ease of understanding, the current embodiment will be further described with reference to FIGS. 19A and 19B.

Figure 19A:
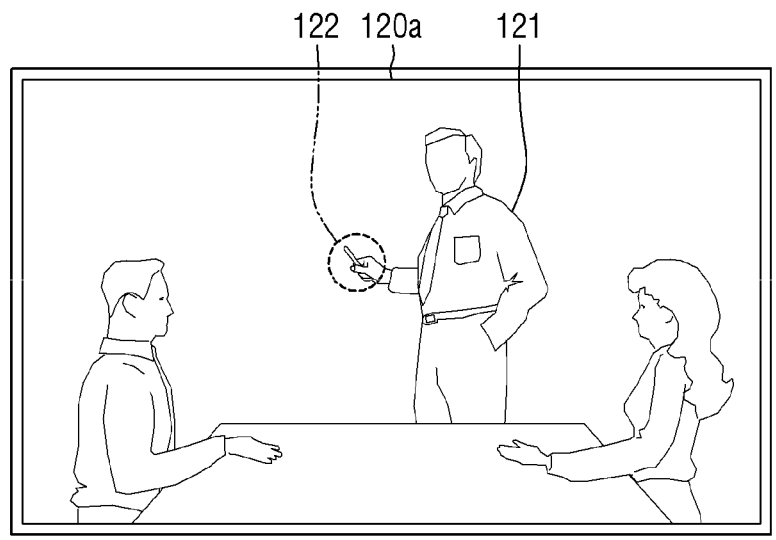
Figure 19B:
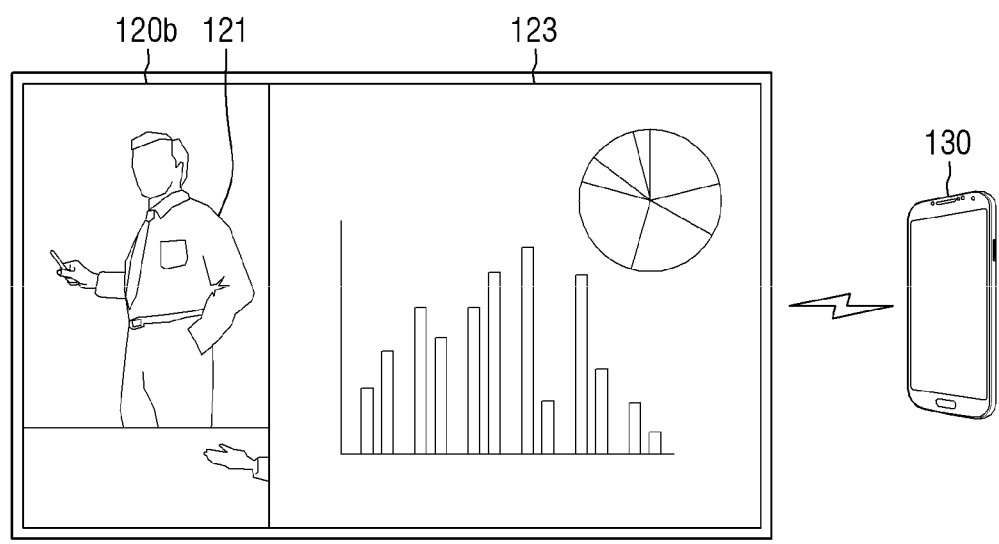

FIGS. 19A and 19B illustrate an example in which a presenter is determined as a person of interest, and presentation content received from a terminal of the presenter is displayed through a service provision device. This example will now be described with reference to FIGS. 19A and 19B.

If it is assumed that the service provision device is a computing device installed at a presentation place, the service provision device may determine a person 121, at whose fingertips a pointer-shaped object 122 has been detected, as a person of interest among a plurality of persons recognized in an input image 120a.

Once the person of interest is determined, as illustrated in FIG. 19B, the service provision device may generate a result image 120b by performing image alignment based on the person of interest 121 and display the result image 120b in a first area of the screen and display presentation content 123 received from a user terminal 130 possessed by the person of interest 121 in a second area of the screen. In FIG. 19B, the result image 120b and the content 123 are displayed in independent areas, respectively. However, the layout, display method, etc. of the service screen can vary as described above.

According to the example described with reference to FIGS. 19A and 19B, a presenter may be automatically determined as a person of interest, and a customized service screen may be automatically configured so that the presenter can give a presentation. Accordingly, user convenience can be greatly improved.

Until now, the method of configuring a user-targeted service provision screen according to the first embodiment of the present disclosure has been described with reference to FIGS. 17 through 19B. Next, a method of configuring a user-targeted service provision screen according to a second embodiment of the present disclosure will be described with reference to FIG. 20.

Figure 20:
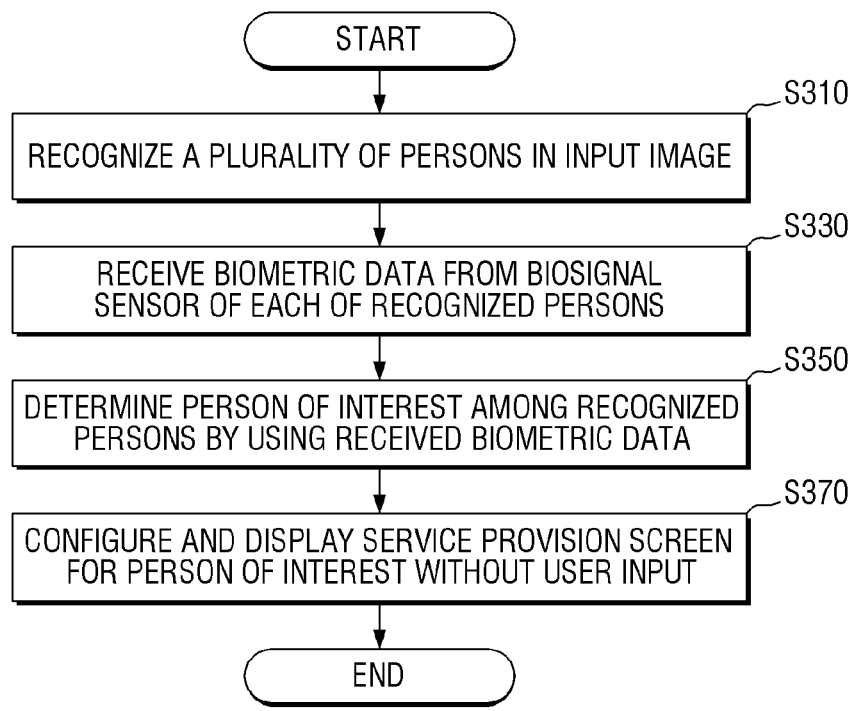
FIG. 20 is a diagram for explaining a method of configuring a user-targeted service provision screen according to a second embodiment of the present disclosure.

FIG. 20 is a flowchart illustrating the method of configuring a user-targeted service provision screen according to the second embodiment. However, this is merely an exemplary embodiment for achieving the objectives of the present disclosure, and some operations can be added or removed as needed.

Referring to FIG. 20, a plurality of persons are recognized in an input image (operation S310).

Next, biometric data is received from a biosignal sensor of each of the recognized persons (operation S330). Here, the biosignal sensor may include, for example, a biosignal sensor attached to the body of a user, a wearable device, and/or a biosignal sensor attached to a user terminal. In addition, the biometric data may include heart rate, blood pressure, oxygen saturation, stress index, degree of brushing, etc.

Next, a person of interest is determined among the recognized persons using the received biometric data (operation S350). For example, a person whose biometric data is not in a normal range, such as a person with high blood pressure, a person with poorly brushed teeth, or a person with a high heart rate may be determined as a person of interest.

In an embodiment, the result of analyzing images of the recognized persons may be further used to determine the person of interest. For example, if a person with abnormal health conditions is to be determined as a person of interest, analysis information such as blood flow information of the face and facial expression information (e.g., a grimace) may be produced through image analysis, and the person of interest may be determined more accurately by additionally using the produced information.

Next, a service provision screen for the person of interest is configured and displayed without user input (operation S370). For example, when a person with abnormal health conditions is determined as a person of interest, exercise content, content regarding a specific disease, etc. may be provided. Alternatively, when a person with poorly brushed teeth is determined as a person of interest, brushing guide content may be provided.

Until now, the method of configuring a user-targeted service provision screen according to the second embodiment of the present disclosure has been described with reference to FIG. 20. According to the above description, a service customized for a user can be provided using biosignal information of the user.

The concept of the present disclosure described above with reference to FIGS. 1 through 20 can be implemented in computer-readable code on a computer-readable medium. The computer-readable recording medium may be, for example, a removable recording medium (a compact disc (CD), a digital versatile disc (DVD), a Blu-ray disc, a universal serial bus (USB) storage device or a portable hard disk) or a fixed recording medium (a ROM, a RAM or a computer-equipped hard disk). The computer program recorded on the computer-readable recording medium may be transmitted to another computing device via a network such as the Internet and installed in the computing device, and thus can be used in the computing device.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various components in the embodiments described above should not be understood as requiring such separation in all embodiments, and it should be understood that the described program components and systems can generally be integrated together in a single software product or packaged into multiple software products.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims. The exemplary embodiments should be considered in a descriptive sense only and not for purposes of limitation.

The invention claimed is:

1. An image alignment method comprising:
  recognizing, by an image alignment device, one or more persons in an input image;
  determining, by the image alignment device, a first person of interest and a second person of interest among the recognized persons;
  displaying, by the image alignment device, within a first display area, an image resulting from performing image alignment on the input image based on the first person of interest;
  displaying, by the image alignment device, within a second display area, an image resulting from performing image alignment on the input image based on the second person of interest;
  calculating respective scores based on respective actions performed by the first person of interest and the second person of interest as shown by the input image; and
  adjusting a size of at least one of the first display area and the second display area based on the respective scores calculated with regard to the first person of interest and the second person of interest.

2. The method of claim 1, further comprising:
  determining an age of a person to be an age matching a pre-specified child age range as a result of analyzing the age of the person among the recognized persons; and
  determining the person as the first person of interest.

3. The method of claim 1, wherein the determining of the first person of interest comprises:
  extracting a face area from each of the recognized persons; and
  determining a person having a largest extracted face area among the recognized persons as the first person of interest.

4. The method of claim 1, wherein the determining of the first person of interest comprises:
  detecting an object having a specified shape at a specified position on each of the recognized persons; and
  determining a person as the first person of interest when the object having the specified shape is detected at the specified position on the person.

5. The method of claim 4, wherein the specified position is a position corresponding to fingertips of a person, and the object having the specified shape is an object having the shape of a toothbrush.

6. The method of claim 4, wherein the determining of the person as the first person of interest when the object having the specified shape is detected at the specified position on the person comprises determining a person who appears first in the input image as the first person of interest among one or more persons, in the input image, having the object having the specified shape at the specified position.

7. The method of claim 4, wherein the determining of the first person as the first person of interest when the object having the specified shape is detected at the specified position on the first person comprises determining a person who is located in a specified direction as the first person of interest among one or more persons, in the input image, having the object having the specified shape at the specified position.

8. The method of claim 1, wherein the determining of the first person of interest comprises:
  detecting an object having the shape of a toothbrush at a position around the mouth of each of the recognized persons; and
  determining a person as the first person of interest when the object having the shape of the toothbrush is detected at the position around the mouth of the person.

9. The method of claim 1, wherein the determining of the first person of interest comprises:
  recognizing a voice; and
  determining a person as the first person of interest when text corresponding to the recognized voice is detected in an area inside an outline of the person.

10. The method of claim 1, wherein the determining of the first person of interest comprises:
  recognizing a voice;
  performing face recognition on each of the recognized persons to detect a person having a name indicated by text corresponding to the recognized voice; and
  determining the person as the person of interest.

11. The method of claim 1, wherein the determining of the first person of interest comprises determining a person of interest who corresponds to a current context through context-based person of interest determination logic performed on each of the recognized persons.

12. The method of claim 11, wherein the determining of the person of interest who corresponds to the current context through the context-based person of interest determination logic performed on each of the recognized persons comprises:
  performing an analysis of demographic characteristics of each of the recognized persons; and
  determining a context based on a combination of the demographic characteristics of the recognized persons and determining a person who meet a condition according to the determined context as the first person of interest.

13. The method of claim 1, wherein the determining of the first person of interest and the second person of interest comprises, determining the first and the second person of interest based on at least one of: demographic characteristics of each of the recognized persons, objects held by each of the recognized persons, and context-based person of interest determination logic performed on each of the recognized persons.

14. The method of claim 1, wherein calculating the respective scores comprises,
  calculating a first degree to which an image of the first person of interest complies with a reference image; and
  calculating a second degree to which an image of the second person of interest complies with the reference image.

15. The method of claim 1, wherein adjusting the size of the at least one of the first display area and the second display area comprises,
  increasing the size of the first display area based on determination that a first score calculated with regard to the first person of interest is higher than a second score calculated with regard to the second person of interest.

16. The method of claim 1, wherein adjusting the size of the at least one of the first display area and the second display area comprises,
  decreasing the size of the second display area based on determination that a first score calculated with regard to the first person of interest is higher than a second score calculated with regard to the second person of interest.

17. The method of claim 1, further comprising:
  displaying a first score calculated with regard to the first person of interest; and
  displaying a second score calculated with regard to the second person of interest.

18. A non-transitory computer readable storage medium having stored therein a computer program that causes a computer to execute:
  recognize one or more persons in an input image;
  determine a first person of interest and a second person of interest among the recognized persons;
  display, within a first display area, an image resulting from performing image alignment on the input image based on the first person of interest;
  display, within a second display area, an image resulting from performing image alignment on the input image based on the second person of interest;
  calculate respective scores based on respective actions performed by the first person of interest and the second person of interest as shown by the input image; and
  adjust a size of at least one of the first display area and the second display area based on the respective scores calculated with regard to the first person of interest and the second person of interest.

19. A smart mirror comprising:
  a front camera sensor which generates an input image;
  an image alignment processor; and
  a display device, wherein the image alignment processor is configured to:
recognize one or more persons in the input image;
determine a first person of interest and a second person of interest among the recognized persons;
display, within a first display area of the display device, an image resulting from performing image alignment on the input image based on the first person of interest;
display, within a second display area of the display device, an image resulting from performing image alignment on the input image based on the second person of interest;
calculate respective scores based on respective actions performed by the first person of interest and the second person of interest as shown by the input image; and
adjust a size of at least one of the first display area and the second display area based on the respective scores calculated with regard to the first person of interest and the second person of interest.

\* \* \* \* \*